United States Patent [19]

Stoll

[11] 3,975,671

[45] Aug. 17, 1976

[54] CAPACITIVE VOLTAGE CONVERTER EMPLOYING CMOS SWITCHES

[75] Inventor: Peter A. Stoll, Santa Clara, Calif.

[73] Assignee: Intel Corporation, Santa Clara, Calif.

[22] Filed: Feb. 24, 1975

[21] Appl. No.: 552,439

[52] U.S. Cl. ................................. 321/15; 307/110; 357/42; 357/59
[51] Int. Cl.² ................................. H02M 3/06
[58] Field of Search .............. 321/15; 307/109, 110; 357/42, 59

[56] References Cited
UNITED STATES PATENTS

| | | | |
|---|---|---|---|
| 3,818,484 | 6/1974 | Nakamura et al. | 321/15 |
| 3,824,447 | 7/1974 | Kuwabara | 321/15 |
| 3,878,450 | 4/1975 | Greatbatch | 321/15 |

OTHER PUBLICATIONS

"Fundamentals of COS/MOS Integrated Ckts." by Bishop et al.; *Solid State Tech.*, Apr., 1974, pp. 85–89.
"Production of C-IGFETS" by Kroel et al.; *IBM Tech. Disc. Bull.* vol. 15, No. 5, Oct., 1972, pp. 1623–1624.

*Primary Examiner*—Gerald Goldberg
*Attorney, Agent, or Firm*—Spensley, Horn, & Lubitz

[57] ABSTRACT

A CMOS circuit for approximately tripling battery voltage particularly adaptable for use with liquid crystal displays such as used in watches. P-wells of the CMOS circuit are coupled to active circuit nodes rather than to battery potentials. In the presently preferred embodiment a hybrid circuit with external capacitors is used to increase overall efficiency.

7 Claims, 2 Drawing Figures

CAPACITIVE VOLTAGE CONVERTER EMPLOYING CMOS SWITCHES

BACKGROUND OF THE INVENTION

1. Field of the Invention

The invention relates to the field of voltage converters employing CMOS devices.

2. Prior Art

Complementary metal-oxide-silicon (CMOS) devices have been utilized in applications where low power consumption is required, such as in electronic watches. In such watches and in other applications voltages higher than those economically available from batteries are required for displays, particularly for liquid crystal displays. In the prior art numerous circuits are known for raising a battery potential, for example, of 1.5 volts, to a higher potential such as 4.5 volts for activating displays.

Generally, the prior art voltage converting circuits employ resistors, diodes, inductors and bipolar transistors in a resonant transfer circuit. These components cannot be integrated into the CMOS circuit used for the remainder of the watch circuitry. Moreover, such components are relatively expensive when compared to the remainder of the watch electronics.

As will be seen, the present invention provides a voltage converter employing only CMOS active devices although external capacitors are utilized in the presently preferred embodiment. The presently disclosed circuit provides a less expensive, and more efficient, converter than known in the prior art.

SUMMARY OF THE INVENTION

A circuit is disclosed for charging a capacitance means and for then coupling the capacitance means in series with another potential means. The capacitance means is coupled between a first and a second connection means. A first transistor is disposed on a substrate of a first conductivity type. This transistor selectively couples the capacitance means so that the capacitance means may be charged. The first transistor includes a channel which is disposed in a well in said substrate, the well being of an opposite conductivity type to the substrate. The capacitance means is coupled to the well. A second transistor is used for coupling the capacitance means and potential means in series. The circuit includes control means which is coupled to the first and second transistors for causing the capacitance means to be alternately charged and coupled in series with the potential means. The potential of the well of the first transistor changes as the capacitance means and potential means are coupled and decoupled, thereby allowing the first transistor to operate as a switch.

DETAILED DESCRIPTION OF THE INVENTION

In the presently preferred embodiment the voltage converter converts a first potential or battery potential to a higher level which is approximately three times the battery potential. As will be appreciated, the principle of the present invention may be utilized for other than voltage tripling. Also in the presently preferred embodiment the CMOS devices are deployed on an n-type substrate where p-type wells are used to define n-channel devices. As will be obvious to one skilled in the art, the invention may be utilized on a p-type substrate.

Figure 1:
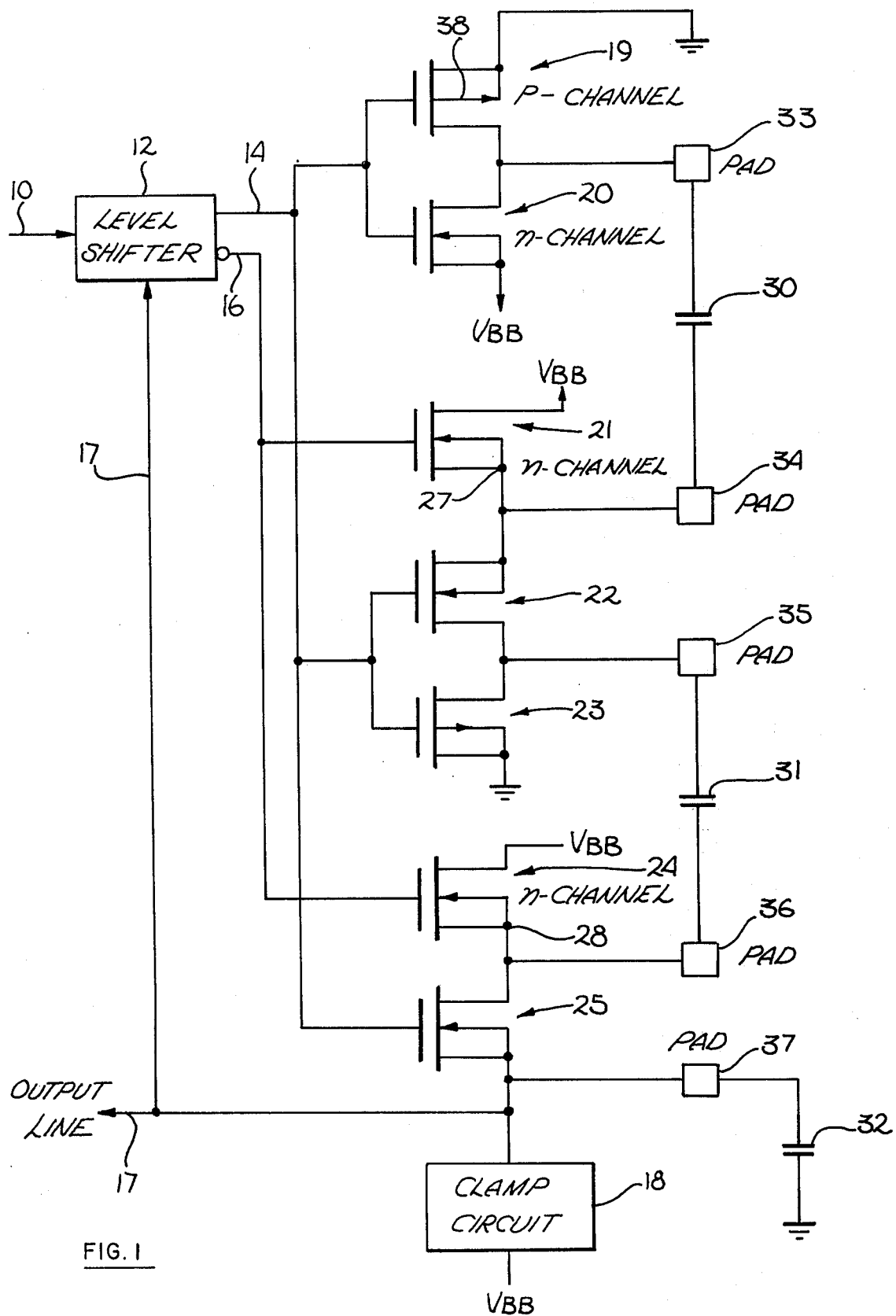
FIG. 1 is a circuit diagram of the presently preferred embodiment of the voltage converter.

In FIG. 1, an input line 10 which is coupled to a level shifter 12 is supplied with a signal such as a 1 khz square wave. The input square wave, or other signal, in the case of a watch may be derived from a crystal source, although such accuracy is not required. The level shifter 12 provides two complementary outputs, one on line 14, and the other on line 16. The output from the circuit of the figure, line 17, is coupled to level shifter and provides a potential greater in magnitude than $V_{BB}$ for powering the lever shifter 12. By way of example, assume an input square wave to level shifter 12 varies between zero and −1.5 volts and that the output on line 17 is approximately −4.5 volts. The output of level shifter 12 would be two square waves varying between zero and approximately −4.5 volts. Any one of a number of known prior art circuits may be utilized for level shifter 12.

In the presently preferred embodiment all the transistors employ polycrystalline silicon gates. The convention used for the transistors in the figure is as follows: an arrow pointing away from the gate signifies a p-channel transistor, an arrow pointing into the gate signifies an n-channel transistor, and the connection between the center line (such as line 38 of transistor 19) and one of the other two terminals of the transistors signifies the biasing of the substrate in the case of p-channel transistors and the p-well in the case of n-channel transistors. For example, transistor 20 has one of its n-type regions and its p-well connected to $V_{BB}$. The other terminal of transistor 20 is coupled to one terminal of transistor 19 and to one terminal of capacitor 30. The other terminal of transistor 19 and the substrate are coupled to the negative potential $V_{BB}$.

Transistors 19 and 20 are coupled in series between ground and $V_{BB}$, the gate of both these transistors are coupled to line 14. Transistors 21, 22 and 23 are coupled in series between $V_{BB}$ and ground. An n-type region of both transistors 21 and 22 along with the p-type wells 40 and 41 (FIG. 2) of transistors 21 and 22, respectively, are coupled to a node 27 defined between transistors 21 and 22; this node being also coupled to the other terminal of capacitor 30. Note that the p-wells of transistors 21 and 22 are coupled to an active signal node in the circuit rather than to a power supply potential. The common node between transistors 22 and 23 is coupled to one terminal of capacitor 31. This node includes an n-type region of transistor 22 and a p-type region of transistor 23. The gate of transistor 21 is coupled to line 16; the gates of transistors 22 and 23 are coupled to line 14.

Transistors 24 and 25 are coupled in series between $V_{BB}$ and a clamp circuit 18. The gate of transistor 24 is coupled to line 16; the gate of transistor 25 is coupled to line 14. The common junction between transistors 24 and 25, node 28, is coupled to the other terminal of capacitor 31. This node includes the p-well 42 of transistor 24, thereby coupling this p-well to an active circuit node. An n-type region of transistor 25, defining one terminal of the transistor, is coupled to one terminal of capacitor 32, the clamp circuit 18 and to the output line 17.

In the presently preferred embodiment capacitors 30, 31 and 32 are external capacitors, that is, they are not part of the common substrate upon which the remainder of the circuit is fabricated. Since the transistors, level shifter 12 and clamp circuit 18 are formed on the same substrate, the external capacitors are coupled to the substrate through "pads". For example, capacitor 30 is coupled between pads 33 and 34, capacitor 31 is coupled between pads 35 and 36 and capacitor 37 is coupled to pad 37, the other terminal of this capacitor being coupled to ground. "On chip" capacitors may be utilized although it has been found that a more efficient circuit is possible where external capacitors are utilized. In the presently preferred embodiment 0.01 microfarads capacitors are utilized.

The clamp circuit 18 is used to clamp line 17 to $V_{BB}$ to activate or start the circuit. Note that the line 17 provides power for level shifter 12; thus to activate the circuit, line 17 is held at the $V_{BB}$ potential through the clamp circuit 18. Once an output is produced on lines 14 and 16, line 17 is released from $V_{BB}$ and allowed to rise (in the negative direction) in potential. In applications where the circuit is utilized as part of a watch, clamp circuit 18 may be a manual switch momentarily closed upon assembly of the watch or when a battery is replaced. Any one of numerous clamping circuits may be utilized for clamp circuit 18 including automatically activated circuits.

In operation capacitors 30 and 31 are charged to the potential $V_{BB}$, in parallel, and then coupled in series with the potential $V_{BB}$ to provide an output on line 17 of approximately $3V_{BB}$. Capacitor 32 which is coupled to line 17 provides filtering of the output signal. Capacitor 30 is charged through transistors 19 and 21; capacitor 31 is charged through transistors 23 and 24. Transistor 20 couples one terminal of capacitor 30 to $V_{BB}$ (for the series connection of the capacitors) while transistors 22 and 25 couple capacitors 30 and 31 in series to line 17.

Assume for the sake of examining the operation of the circuit, that a negative potential equal to approximately $3V_{BB}$ is present on line 14, while simultaneously, a zero potential exists on line 16. The negative potential on the gates of transistors 19 and 23 cause these transistors to conduct while the same negative potential of the gates of transistors 20, 22 and 25 prevent these transistors from conducting. The zero potential (line 16) on the gates of the pull-down transistors 21 and 24 cause these transistors to conduct. Thus, when a negative potential is present on line 14, and a zero potential on line 16, capacitor 30 charges through transistors 19 and 21 and capacitor 31 charges through transistors 23 and 24.

When the output from level shifter 12 changes and a negative potential equal to approximately $3V_{BB}$ is present on line 16 and a zero potential on line 14, transistor 19 ceases to conduct and transistor 20 conducts. Similarly, transistors 21 and 23 cease to conduct while transistor 22 conducts. Also transistor 24 ceases to conduct and transistor 25 conducts. Since the capacitors are assumed to have been previously charged, the potential present on line 17 is equal to $V_{BB}$ plus the sum of the voltages to which capacitors 30 and 31 have been charged. In actual tests the potential on line 17 approaches $3V_{BB}$.

Figure 2:
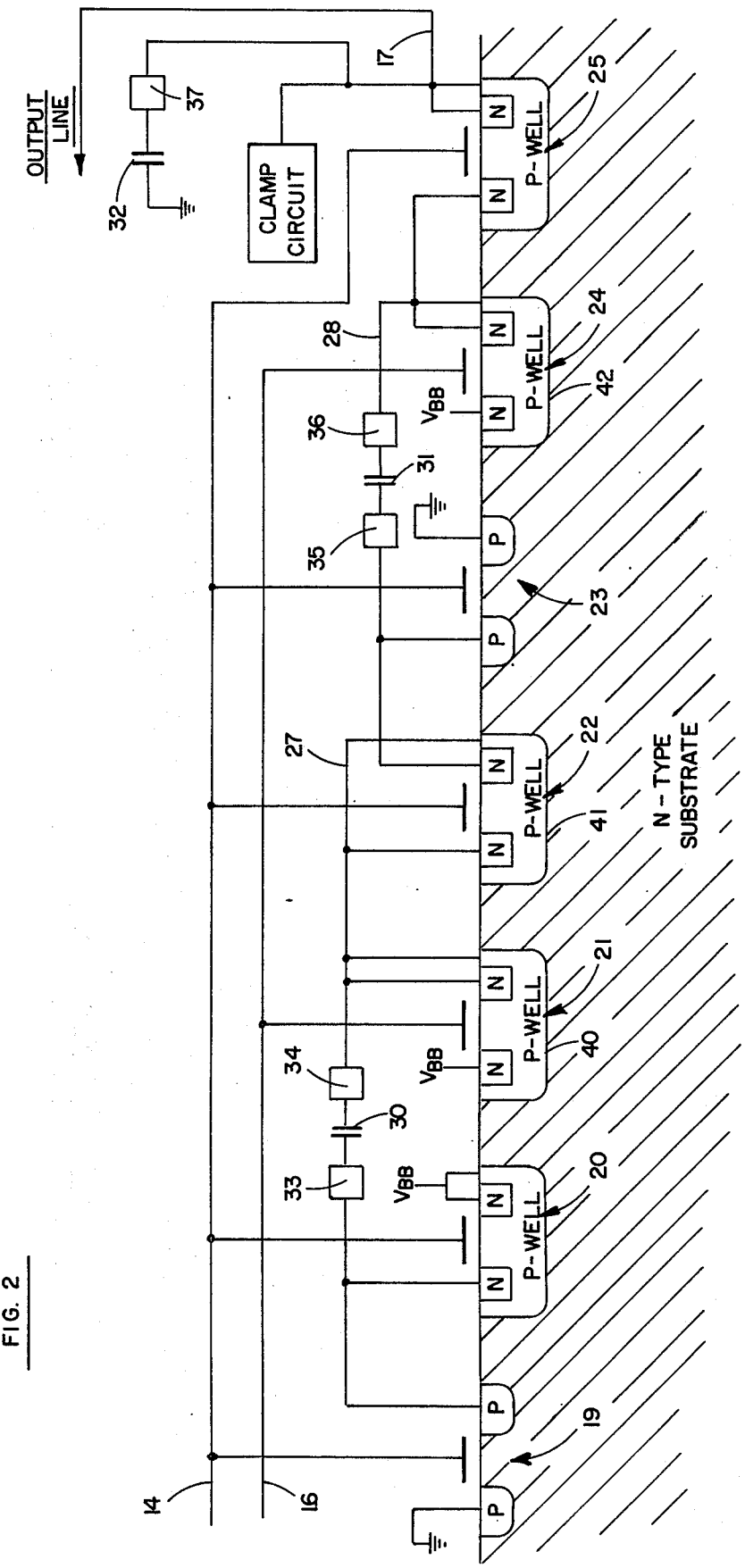
FIG. 2 is a cross-sectional elevation view of a substrate which includes the transistors of FIG. 1.

In FIG. 2 transistors 19, 20, 21, 22, 23, 24 and 25 are shown on an n-type substrate. The connections between these transistors and particularly the capacitors 30 and 31 are again shown. From this figure the p-well connections are readily seen, note that the p-wells 40 and 41 for transistors 21 and 22, respectively are coupled to pad 34, and that the p-well 42 for transistor 24 is coupled to pad 36. Thus the potential of these wells may vary as will be explained. (Note the pads 33, 34, 35, 36 and 37 are shown above the substrate for purposes of illustration in FIG. 2).

An important aspect of the present invention is the fact that the p-well 40 of the transistor 21 is coupled to an active node, node 27. If this p-well were coupled to line 17, transistor 21 would fail to turn on when a zero potential was present on line 16. On the other hand, if the p-well 40 of transistor 21 was coupled to $V_{BB}$, transistor 21 would turn on and charge capacitor 30, however, when capacitor 30 is coupled in series with $V_{BB}$, the potential on node 27 rises above $V_{BB}$ (in the negative sense) providing a forward biased junction with transistor 21. Since the p-well 40 of transistor 21 is coupled to the active node 27, transistor 21 turns on at the appropriate potential, and also remains off when the capacitors are coupled in series. The same is true for pull-down transistor 24 in that its p-well 24 is coupled to an active node 28.

Thus, a voltage converter has been disclosed in the form of a voltage tripler which utilizes CMOS circuits in which external capacitors are first charged in parallel and then coupled in series to provide a higher potential. The circuit is made feasible in part by coupling p-wells of the pull-down transistors to active nodes.

I claim:

1. An MOS integrated circuit disposed on a substrate of a first conductivity type, for coupling a capacitance means to a source of potential such that said capacitance means may be charged from said source of potential, and for coupling said capacitance means to a connection means comprising:

a first well of a second conductivity type disposed on said substrate; said well being coupled to said capacitance means;

a first transistor disposed in said first well, said first transistor including a pair of regions of said first conductivity type, one of said regions coupled to said source of potential and the other of said regions coupled to said capacitance means; and, a second transistor, said second transistor including a pair or regions of said first conductivity type, one of said regions coupled to said capacitance means and the other region coupled to said connection means;

whereby said capacitance means may be charged from said source of potential then coupled in series with said source of potential or other capacitance means to provide a higher output potential.

2. The circuit defined by claim 1 wherein said second transistor is disposed in a well of said second conductivity type.

3. The circuit defined by claim 2 wherein said first conductivity type is n-type.

4. A CMOS integrated circuit disposed on a substrate of a first conductivity type for charging a capacitor from a source of potential, and for coupling said capacitor in series with said source of potential to provide a higher potential than said source of potential, said source of potential including a first and second potential terminal and said capacitor including a first and second capacitor terminal, comprising:

a first transistor disposed on said substrate, said first transistor including a pair of regions of a second conductivity type, one of said regions coupled to said first potential terminals and the other of said regions coupled to said first capacitor terminal;

a first p-well, said first p-well coupled to said second potential terminal;

a second transistor disposed in said first p-well said second transistor including a pair of regions of said first conductivity type, one of said regions coupled to said first capacitor terminal and the other of said regions coupled to said second potential terminal;

a second p-well disposed in said substrate, said second p-well coupled to said second capacitor terminal;

a third transistor disposed in said second p-well, said third transistor including a pair of regions of said first conductivity type, one of said regions coupled to said second potential terminal and the other of said regions coupled to said second capacitor terminal;

a fourth transistor disposed on said substrate, said fourth transistor including a pair of regions of said first conductivity type, one of said regions coupled to said second capacitor terminal;

a fifth transistor disposed on said substrate, said fifth transistor including a pair of regions of said second conductivity type, one of said regions coupled to said first potential terminal and the other of said regions providing a common terminal with said other region of said fourth transistor;

whereby said capacitor may be charged from said source of potential and then coupled in series with said source of potential to provide a higher potential at said common terminal.

5. The circuit defined by claim 4 wherein said fourth transistor is disposed within a p-well.

6. The circuit defined by claim 5 wherein said p-well of said fourth transistor is coupled to said second capacitor terminal.

7. The circuit defined by claim 4 wherein said first conductivity type is n-type.

* * * * *